United States Patent
Oostra

(10) Patent No.: US 11,011,082 B2
(45) Date of Patent: May 18, 2021

(54) STAIRWAY SAFETY DEVICE

(71) Applicant: ProMedica Health System, Inc., Toledo, OH (US)

(72) Inventor: Randy Oostra, Toledo, OH (US)

(73) Assignee: PROMEDICA HEALTH SYSTEM, INC., Toledo, OH (US)

(*) Notice: Subject to any disclaimer, the term of this patent is extended or adjusted under 35 U.S.C. 154(b) by 522 days.

(21) Appl. No.: 15/980,847

(22) Filed: May 16, 2018

(65) Prior Publication Data

US 2018/0336804 A1    Nov. 22, 2018

Related U.S. Application Data

(60) Provisional application No. 62/506,842, filed on May 16, 2017.

(51) Int. Cl.
| | |
|---|---|
| *G09F 7/12* | (2006.01) |
| *B32B 27/40* | (2006.01) |
| *G09F 19/22* | (2006.01) |
| *B32B 27/06* | (2006.01) |

(52) U.S. Cl.
CPC .............. *G09F 7/12* (2013.01); *B32B 27/06* (2013.01); *B32B 27/40* (2013.01); *G09F 19/22* (2013.01); *B32B 2471/04* (2013.01); *G09F 2007/127* (2013.01)

(58) Field of Classification Search
CPC ............... G09F 7/12; G09F 2007/127; G09F 2007/1856; G09F 19/22; G09F 19/228
See application file for complete search history.

(56) References Cited

U.S. PATENT DOCUMENTS

| | | |
|---|---|---|
| 3,785,719 A | 1/1974 | Jonnes |
| 3,935,365 A | 1/1976 | Eigenmann |
| 3,975,083 A | 8/1976 | Rowland |
| 4,020,211 A | 4/1977 | Eigenmann |
| 4,069,281 A | 1/1978 | Eigenmann |
| 4,117,192 A | 9/1978 | Jorgensen |
| 4,248,932 A | 2/1981 | Tung et al. |
| 4,299,874 A | 11/1981 | Jones et al. |
| RE31,669 E | 9/1984 | Eigenmann |
| 4,490,432 A | 12/1984 | Jordan |
| 4,554,214 A | 11/1985 | Ichinomiya et al. |
| 4,648,689 A | 3/1987 | May |
| 4,664,966 A | 5/1987 | Bailey et al. |
| 4,747,981 A | 5/1988 | Robinson |
| 4,921,754 A | 5/1990 | Ishihara |
| 4,937,127 A | 6/1990 | Haenggi et al. |
| 4,988,555 A | 1/1991 | Hedblom |
| 4,990,024 A | 2/1991 | Eigenmann |
| 5,077,117 A | 12/1991 | Harper et al. |
| 5,117,304 A | 5/1992 | Huang et al. |
| 5,127,973 A | 7/1992 | Sengupta et al. |
| 5,194,113 A | 3/1993 | Lasch et al. |
| 5,286,682 A | 2/1994 | Jacobs et al. |

(Continued)

*Primary Examiner* — Gary C Hoge
(74) *Attorney, Agent, or Firm* — Michael E. Dockins; Shumaker, Loop & Kendrick, LLP

(57) ABSTRACT

A safety device includes a body configured for attachment to a structure. The body has a first layer and a second layer. The body is washable, reusable, and attachable to varying surface compositions. An indicia is formed in the first layer, the indicia providing visual stimuli for persons with impaired depth perception.

13 Claims, 2 Drawing Sheets

(56) References Cited

U.S. PATENT DOCUMENTS

| | | | |
|---|---|---|---|
| 5,328,293 A | 7/1994 | Keefe | |
| 5,340,652 A | 8/1994 | Sondhe et al. | |
| 5,374,465 A | 12/1994 | Fulcomer | |
| 5,411,351 A | 5/1995 | Lasch et al. | |
| 5,422,162 A | 6/1995 | Passarino et al. | |
| 5,437,907 A | 8/1995 | Peil et al. | |
| 5,453,320 A | 9/1995 | Harper et al. | |
| 5,501,545 A * | 3/1996 | Walter | G02B 5/124 |
| | | | 359/531 |
| 5,514,441 A | 5/1996 | Pohto et al. | |
| 5,536,569 A | 7/1996 | Lasch et al. | |
| 5,593,246 A | 1/1997 | Hedblom et al. | |
| 5,683,746 A | 11/1997 | Hedblom et al. | |
| 5,706,133 A | 1/1998 | Orensteen et al. | |
| 5,747,626 A | 5/1998 | Krepski et al. | |
| 5,750,191 A | 5/1998 | Hachey et al. | |
| 5,759,928 A | 6/1998 | Harper | |
| 5,775,016 A * | 7/1998 | Chien | G09F 19/22 |
| | | | 40/544 |
| 5,895,170 A | 4/1999 | Chambers et al. | |
| 5,904,017 A * | 5/1999 | Glatz | E04F 11/166 |
| | | | 52/287.1 |
| 5,981,033 A | 11/1999 | Haunschild et al. | |
| 6,027,764 A | 2/2000 | Gurney | |
| 6,041,533 A * | 3/2000 | Lemmond, Jr. | G09F 19/22 |
| | | | 40/584 |
| 6,051,297 A | 4/2000 | Maier et al. | |
| 6,191,200 B1 | 2/2001 | Phillips | |
| 6,431,788 B1 | 8/2002 | Hedblom et al. | |
| 6,479,102 B1 * | 11/2002 | Hunter | E04F 11/16 |
| | | | 427/256 |
| 6,482,288 B1 * | 11/2002 | Kreckel | A47G 1/17 |
| | | | 156/247 |
| 6,521,718 B2 | 2/2003 | Goeb et al. | |
| 6,533,870 B1 | 3/2003 | Granstrom et al. | |
| 6,676,261 B2 | 1/2004 | Mullen et al. | |
| 6,726,982 B2 | 4/2004 | Christian et al. | |
| 6,833,434 B2 | 12/2004 | Kang | |
| 6,953,624 B2 | 10/2005 | Bacon, Jr. | |
| 7,458,693 B2 | 12/2008 | Shipman et al. | |
| 7,753,616 B2 | 7/2010 | Greer et al. | |
| 8,342,700 B2 | 1/2013 | Naik et al. | |
| 8,950,971 B2 | 2/2015 | Greer et al. | |
| 2003/0069358 A1 | 4/2003 | Helland et al. | |
| 2003/0194538 A1 * | 10/2003 | Keane | B44C 1/162 |
| | | | 428/187 |
| 2004/0071915 A1 * | 4/2004 | Keane | B32B 7/06 |
| | | | 428/40.1 |
| 2004/0134107 A1 * | 7/2004 | Hinterkeuser | G09F 19/22 |
| | | | 40/584 |
| 2004/0216344 A1 * | 11/2004 | Bateman | G09F 19/22 |
| | | | 40/611.05 |
| 2005/0016096 A1 * | 1/2005 | Wright, Jr. | B44C 5/0446 |
| | | | 52/311.1 |
| 2005/0034341 A1 * | 2/2005 | Leutton | G09F 19/22 |
| | | | 40/594 |
| 2006/0062974 A1 * | 3/2006 | Keane | B32B 7/06 |
| | | | 428/195.1 |
| 2008/0236008 A1 | 10/2008 | Greer et al. | |
| 2011/0059295 A1 | 3/2011 | Greer et al. | |
| 2011/0200789 A1 | 8/2011 | Budd et al. | |
| 2011/0296727 A1 * | 12/2011 | Savagian | B32B 27/36 |
| | | | 40/594 |
| 2012/0301657 A1 | 11/2012 | Dietrichsson | |
| 2015/0144257 A1 | 5/2015 | Le Normand et al. | |
| 2015/0191603 A1 | 7/2015 | Jing et al. | |
| 2015/0329327 A1 * | 11/2015 | Daws | G09F 19/22 |
| | | | 156/242 |
| 2016/0208063 A1 | 7/2016 | Garbe et al. | |
| 2016/0284255 A1 | 9/2016 | Henshue et al. | |
| 2016/0335930 A1 * | 11/2016 | Abu Al-Rubb | G09F 7/16 |
| 2016/0362856 A1 | 12/2016 | Teng et al. | |
| 2017/0309206 A1 * | 10/2017 | Hyman | G09F 3/10 |
| 2018/0291637 A1 * | 10/2018 | Schultz | E04F 15/107 |

* cited by examiner

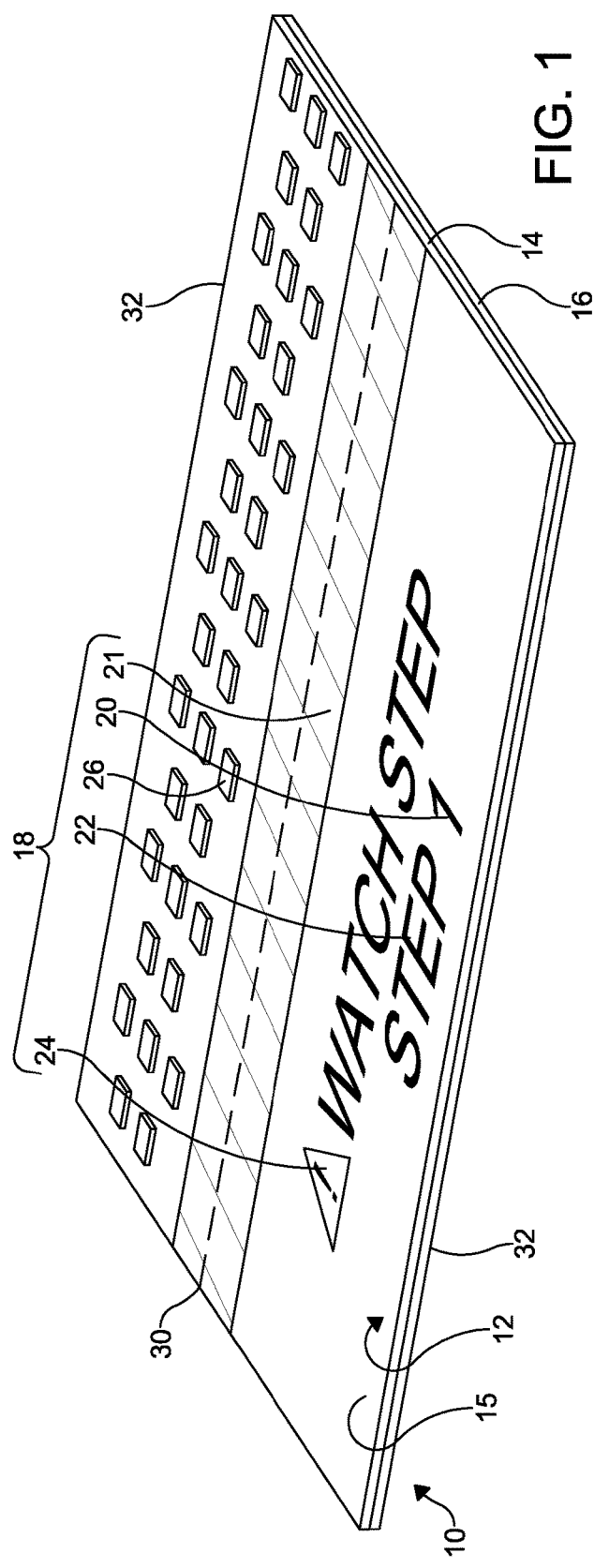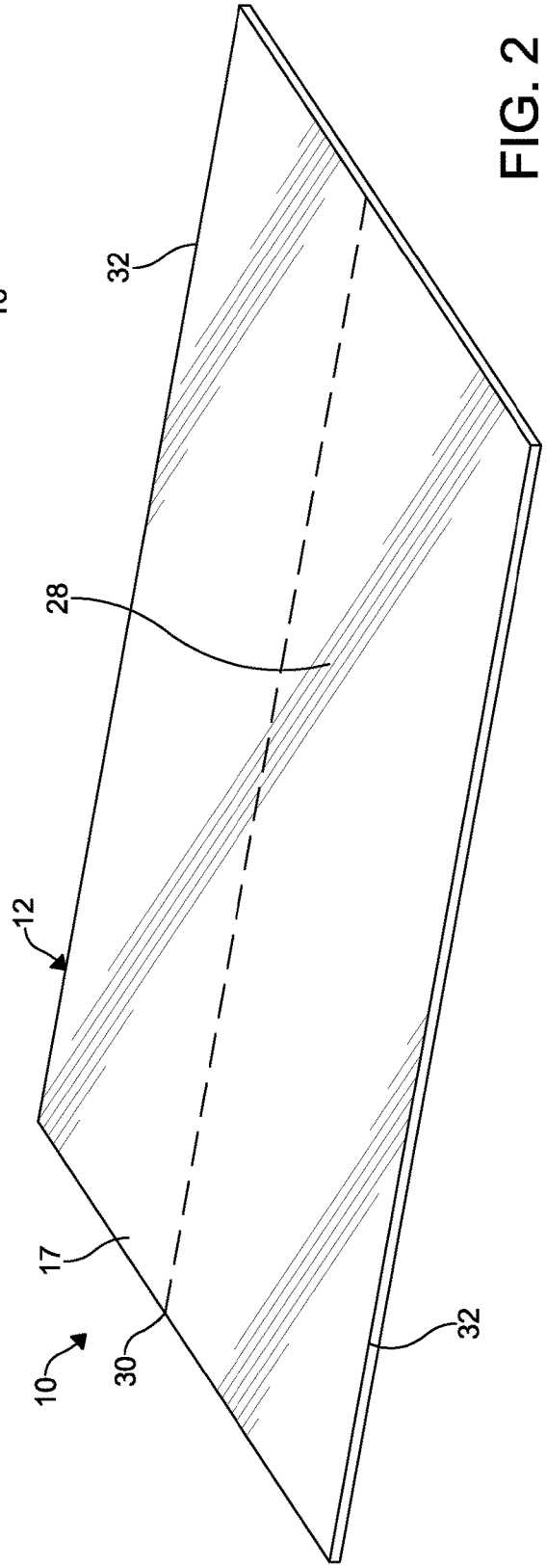

STAIRWAY SAFETY DEVICE

CROSS-REFERENCE TO RELATED APPLICATIONS

This patent application claims the benefit of U.S. Pat. Appl. Ser. No. 62/506,842, filed on May 16, 2017. The entire disclosure of the above patent application is hereby incorporated by reference.

FIELD OF THE INVENTION

The present invention relates to a safety device for stairways.

BACKGROUND OF THE INVENTION

As is known, stairways or steps facilitate permitting persons to ascend or descend levels of a building. Occasionally, it is necessary to warn or alert persons of the stairways or steps to prevent tripping or falling or of other hazards. Signage or devices are often employed to provide warnings. However, the known devices are not reusable and cannot be adapted to stairways or stairs with varying surfaces. For example, it may be difficult to employ a warning device or signage on stairway surfaces that are carpeted or concrete. Additionally, the known warning devices typically get worn or damaged or can get dirty and are not easily cleaned or replaced without damaging the underlying surface. Therefore, it can be expensive to provide different or replacement warning devices for varying surfaces as well as maintain a cleanliness of the devices. Additionally, it is especially difficult for persons with impaired depth perception to properly see the stairways or warning devices.

The present invention contemplates a reusable safety stairway device facilitating adequate warning for persons with impaired depth perception that can be employed on varying surfaces and easily cleaned.

SUMMARY OF THE INVENTION

Consistent and consonant with the present invention, a reusable safety stairway device facilitating adequate warning for persons with impaired depth perception that can be employed on varying surfaces and easily cleaned has surprisingly been discovered.

According to an embodiment of the disclosure, a safety device is disclosed. The safety device includes a body configured for attachment to a structure. The body has a first layer and a second layer. The body is washable, reusable, and attachable to varying surface compositions. An indicia is formed in the first layer, the indicia providing visual stimuli for persons with impaired depth perception.

According to another embodiment of the disclosure, a safety device for coupling to a surface of a structure is disclosed. The safety device including a body configured for attachment to the surface of the structure. The body has a first layer and a second layer. The first layer is formed from a polyurethane gel elastomer. An indicia is formed in the first layer. The indicia providing visual stimuli for persons with impaired depth perception.

According to yet another embodiment of the disclosure, a method of using a safety device for persons with impaired depth perception is disclosed. The method including the step of providing a safety device. The safety device including a body having a first layer and a second layer and an indicia formed in the first layer. The indicia provides visual stimuli for the persons with impaired depth perception. The method includes the steps of attaching the safety device to a surface of a first structure, removing the safety device from the first structure, and reapplying the safety device on one of the surface of the first structure and a surface of a second structure.

BRIEF DESCRIPTION OF THE DRAWINGS

The above, as well as other objects and advantages of the invention, will become readily apparent to those skilled in the art from reading the following detailed description of an embodiment of the invention when considered in the light of the accompanying drawing which:

FIG. 1 is a top perspective view of a safety device for coupling to a structure according to an embodiment of the present disclosure;

FIG. 2 is a bottom perspective view of the safety device for coupling to a structure according to an embodiment of the present disclosure.

DETAILED DESCRIPTION OF EXEMPLARY EMBODIMENTS OF THE INVENTION

Figure 3:
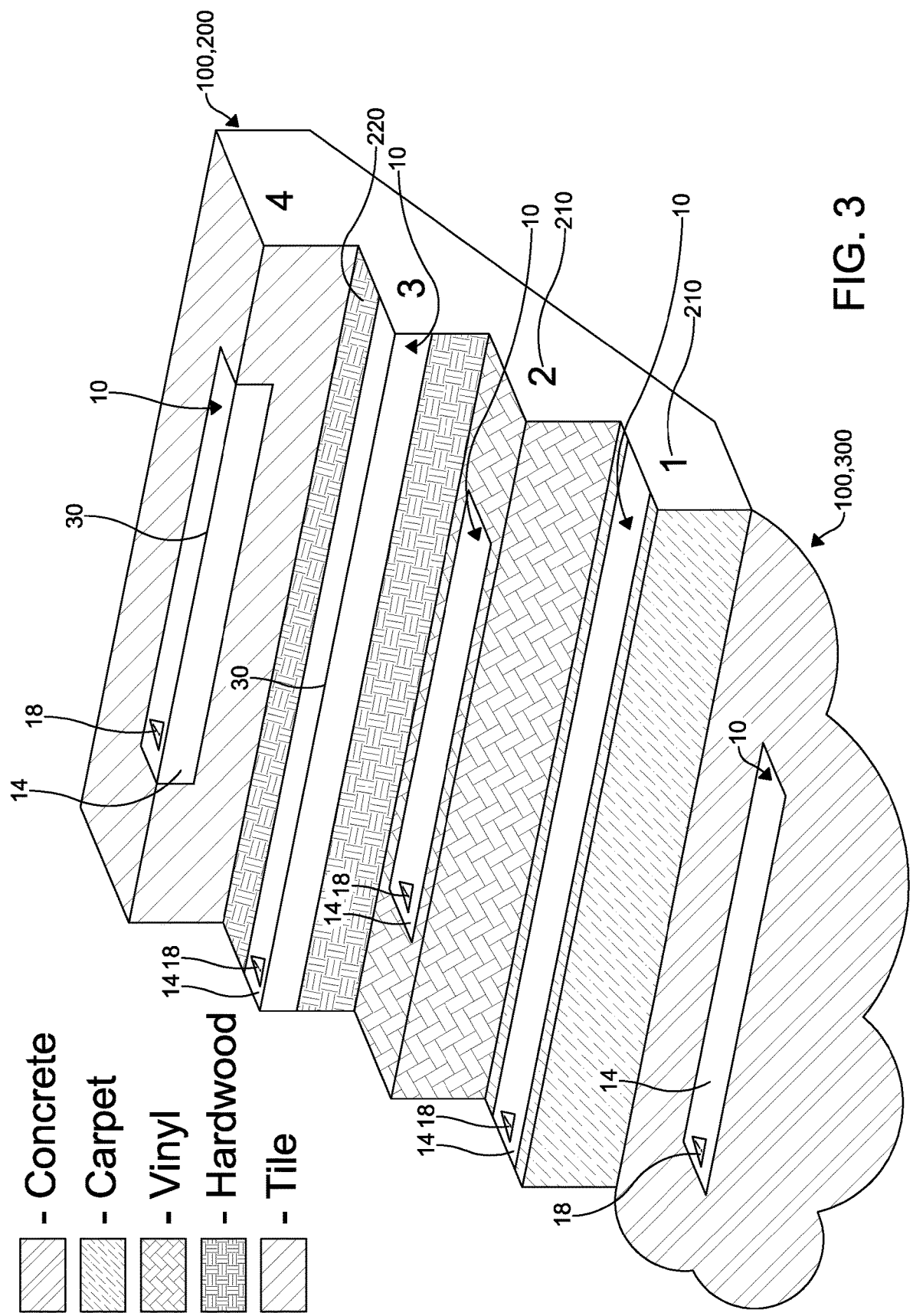
FIG. 3 is a perspective view of a stairwell and a support, illustrating various exemplary structural arrangements of the safety device of FIGS. 1-2 with respect to the stairwell and the support.

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

FIGS. 1-2 illustrate a safety device 10 according to an embodiment of the disclosure. The safety device 10 is configured for use on a structure 100 (described in further detail with reference to FIG. 3) to provide warnings against tripping or falling hazards. The safety device 10 includes a body 12 in the form of a mat or strip including a first layer 14 and a second layer 16. Although, it is understood the body can 12 be formed from only the first layer 14.

The first layer 14 may be formed from any suitable material such as paper, a polymeric material, a metal, a composite material, or the like. The first layer 14 includes visual indicia 18 on a surface 15 thereof to alert those with depth perception issues of a hazard. The indicia 18 could be bright colors 21 (as indicated by the diagonal lines), numbering 20, lettering 22, symbols 24, surface features 26 such as protrusions or etching or indentations, or other indicia as desired to assist persons with minimized or impaired depth perception. The indicia 18 provides visual stimuli for the persons with the impaired depth perception.

The second layer 16 is formed from a polyurethane material. For example, the polyurethane is a polyurethane gel elastomer having a tacky or sticky feel when contacted by a user. As described herein, the polyurethane gel elastomer is a class of very soft, according to the Durometer scale, casting resin material such as the polyurethane gel elastomer manufactured by Northstar Polymers of Minneapolis, Minn. Although, other polyurethane materials can be employed as desired. The polyurethane gel elastomer is a material that is washable and reusable. As used herein, washable means capable of being cleaned with liquids or cleaning chemicals without deterioration and without losing the tactile properties that facilitate removable adhesion of the device 10 to the structure 100. Reusable means capable of use and adaptable for use in in different locations or environments and removable for use from one location to another location without damage or wear.

The second layer 16 may include an attachment means 28 disposed on at least a portion of a surface 17 thereof configured for removable attachment to the structure 100. For example, the attachment means 28 can be an adhesive applied to a material (not shown) with the material disposed on the surface 17. In other examples, the attachment means 28 can be a hook and loop system, a plurality of pins or hooks, a malleable material configured to adhere to surfaces of the structure 100 or any other attachment means as desired. The second layer 16 can be monolithically formed with the first layer 14 or separately formed from the first layer 14 and attached thereto by attachment means such as an adhesive, hook and loop system, rivets, or any other attachment means configured to attach the first layer 14 to the second layer 16. Whether the attachment means 28 covers an entirety of the surface 17 or a portion thereof, the attachment means 28 may be adapted to be removably coupled or adhered to the surface 17 of the second layer 16. In this way, the attachment means 28 may be removed from the device 10 during a cleaning thereof or for replacement with a new attachment means 28. It is understood that the device 10 will function as intended and anticipated herein with or without the attachment means 28.

As shown, the safety device 10 is substantially rectangular. However, it is understood the safety device 10 can be any shape as desired. The safety device 10 can be folded or bent along an edge line 30 disposed intermediate opposing sides 32 of the safety device. The edge line 30 facilitates folding or bending of the safety device 10 for a pair of surfaces that are non-planar with respect to each other.

The safety device 10 is configured to be used on any type of surface including carpet, hardwood, vinyl, tile, concrete, compositions thereof, or any other type of surface commonly employed with structures. As a result, the safety device 10 can be removably adhered to one surface and then moved from that surface to and removably adhered to another another without compromising the integrity or purpose thereof.

FIG. 3 illustrates examples of the safety device 100 coupled to various examples of the structure 100. For example, the structure 100 can be a stairwell 200. The stairwell 200 includes at least one step 210. In the embodiment illustrated, four steps are shown (e.g. a first step 1, a second step 2, a third step 3, and a fourth step 4) for illustrative purposed. It should be understood, the stairwell 200 can include any number of steps more than or fewer than four steps.

The safety device 10 is shown coupled to the stairwell 200 according to various examples. According to one example, as shown with respect to the first step 1, the safety device 10 is coupled to a horizontal surface 220 of the first step 1, wherein the indicia 18 is exposed to alert persons of the steps and potential hazards, such as tripping or falling hazards. The horizontal surface 220 of the first step is carpet. The safety device 10 extends along a length of the first step 1. According to another example, as shown with respect to the second step 2, the safety device 10 is coupled to the horizontal surface 220 of the second step 2 similar to the safety device coupled to the first step 1. However, according to this example, the safety device does not extend the length of the second step 2 and is positioned intermediate ends of the second step 2. The horizontal surface 220 of the second step 2 is vinyl.

According to another example, as shown with respect to step 3, the safety device 10 is bent along the edge line 30 and coupled to the third step 3. The edge line 30 is aligned with the edge of the third step 3, wherein a first portion of the safety device 10 extends along the horizontal surface 220 of the third step and a second portion of the safety device 10 extends along a vertical surface 230. The indicia 18 is exposed to alert persons of the steps and hazards such as tripping or falling hazards. The horizontal surface 220 and the vertical surface 230 of the third step 3 is hardwood. The safety device 10 extends along a length of the third step 3. In yet another example, as shown with respect to the fourth step 4, the safety device 10 is coupled to the fourth step 4 similar to the safety device 10 coupled to the third step 3. However, in this example the safety device 10 does not extend the length of the fourth step 4 and is positioned intermediate ends of the fourth step 4. The horizontal surface 220 and the vertical surface 230 of the fourth step 4 is tile.

The structure 100 can also be a floor 300. The safety device 10 is removably adhered to the floor 300 by the second layer 16 and/or the attachment means 28, if present, wherein the indicia 18 is exposed to alert persons of the steps and/or hazards such as tripping or falling hazards. The floor 300 is concrete in the example. As mentioned hereinabove, the safety device 10 can be attached any type of surface as desired and not limited to carpet, vinyl, hardwood, tile, or concrete.

Advantageously, the safety device 10 can be used on any surface and can be reused and washed and still efficiently attach to the structure 100 such as a stairwell or floor or any other type of structure. Furthermore, the safety device can be removed and transferred to another structure or reattached to same structure after being washed due to the material used to form the second layer 16 maintaining its tackiness even after washing. Due to the material used to form the safety device 10, which is reusable and washable, the safety device 10 can be suitable for environments with sanitary requirements such as a hospital, school, and nursing home or any other environment with sanitary requirements. The safety device 10 is durable which results in minimal wear. The safety device 10 also efficiently conveys warnings to those with impaired depth perception.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A safety device comprising:
 a body configured for attachment to a structure, the body having a first layer and a second layer, the body is washable, reusable, and attachable to varying surface compositions, wherein the first layer is a polyurethane gel elastomer; and
 an indicia formed on the first layer, the indicia providing visual stimuli for persons with impaired depth perception.

2. The safety device of claim 1, wherein the second layer includes attachment means.

3. The safety device of claim 2, wherein the attachment means is an adhesive.

4. The safety device of claim 1, wherein the indicia is at least one of a number, a color, a letter, and a symbol.

5. The safety device of claim 1, wherein the indicia is a surface feature.

6. The safety device of claim 1, wherein the first layer is monolithically formed with the second layer.

7. The safety device of claim 1, wherein the first layer is separately formed from the second layer and coupled to the second layer.

8. The safety device of claim 1, wherein the body is foldable about an edge line.

9. A safety device for coupling to a surface of a structure comprising:
 a body configured for attachment to the surface of the structure, wherein the structure is a step and the body includes an edge line configured for aligning with an edge of the step so the body is capable of engaging a horizontal surface of the step and a vertical surface of the step, the body having a first layer and a second layer, the first layer formed from a polyurethane, wherein the second layer is a reusable adhesive; and
 an indicia formed on the first layer, the indicia providing visual stimuli for persons with impaired depth perception, wherein the indicia includes protrusions and a symbol.

10. The safety device of claim 9, wherein the body is reusable, washable, and adaptable for coupling to various compositions of the surface.

11. The safety device of claim 9, wherein the indicia further includes a number, a color, and a letter.

12. The safety device of claim 9, wherein the first layer is monolithically formed with the second layer.

13. The safety device of claim 9, wherein the surface of the structure is at least one of a carpet, a hardwood, a vinyl, a tile, and a concrete.

* * * * *